Jan. 5, 1932.  V. C. KING  1,839,226
CONVEYER BELT
Filed Nov. 10, 1930
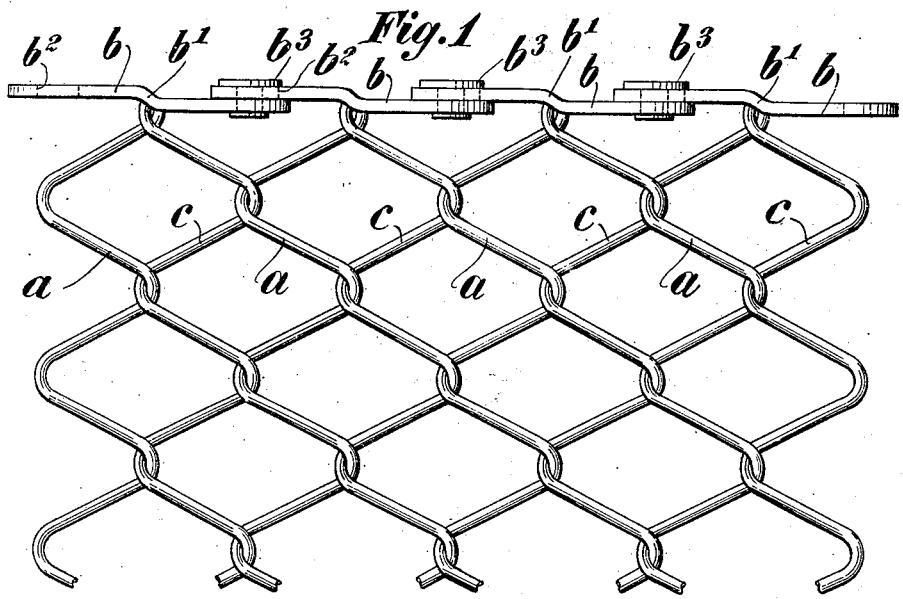
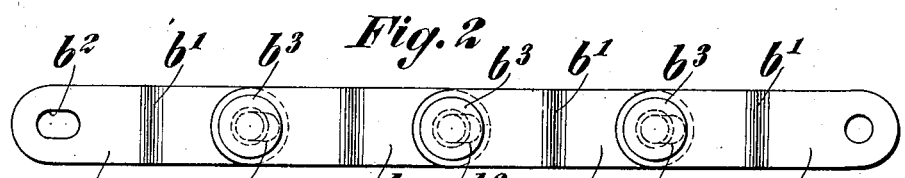
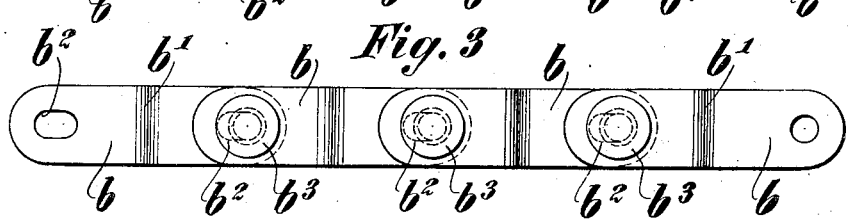
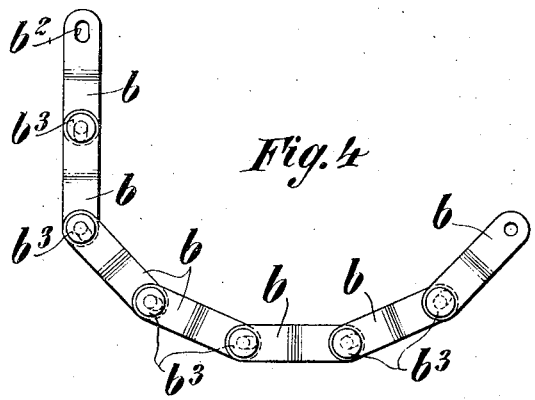
INVENTOR
Vernon C. King,
BY
Redding, Greeley, O'Shea & Campbell.
HIS ATTORNEYS Patented Jan. 5, 1932

1,839,226

UNITED STATES PATENT OFFICE

VERNON C. KING, OF WORCESTER, MASSACHUSETTS, ASSIGNOR TO EDWARD C. BOWERS AND CHARLES L. FELDMAN, RECEIVERS FOR WICKWIRE SPENCER STEEL COMPANY, OF NEW YORK, N. Y., A CORPORATION OF MASSACHUSETTS

CONVEYER BELT

Application filed November 10, 1930. Serial No. 494,584.

The present invention relates to flexible conveyer belts and embodies, more specifically, an improved belt formed of a plurality of interengaged elongated coils of wire extending transversely of the belt, the coils being mounted upon links which are pivotally secured together at their ends to afford complete flexibility of the belt in bending in either direction.

Where conveyer belts are utilized for conveying hot bodies, as well as for conveying bodies having appreciable weight, there is a tendency for the belt to elongate due to the tension and heat applied thereto. To afford a belt having sufficient strength, as well as one which is sufficiently resistant to elongating stresses, designs have been provided wherein transverse reinforcing members are incorporated to resist the shortening of the belt transversely. Further forms have been provided which incorporate means for preventing bodies from falling from the belt and include upwardly extending projections at the sides thereof, these projections usually being formed with the links.

The belt constructed in accordance with the present invention is characterized by great strength and flexibility, at the same time being sufficiently light to permit the same to be readily handled.

In addition, the invention contemplates the provision of a belt wherein the elements constitute a plurality of pairs of interengaged wire coils, the pairs being welded at their ends to successive links of the belt.

The invention further contemplates the provision of a belt structure of the above character wherein a belt is provided which is equally flexible for curving in opposite directions, thus facilitating the movement of the belt over a series of pulleys.

A further object of the invention is to provide a belt of the above character wherein provision for a degree of elongation is provided, the links being formed with slotted connections whereby relative axial movement thereof is provided.

Further objects, not specifically enumerated above, will be apparent as the invention is described in greater detail in connection with the accompanying drawings, wherein:

Figure 1 is a plan view showing a portion of a belt constructed in accordance with the present invention.

Figure 2 is a view in side elevation, showing the links of the belt in their elongated positions.

Figure 3 is a view similar to Figure 2, showing such links in their contracted positions.

Figure 4 is a view in side elevation, showing the links of the belt in a position assumed during the passage of the belt over a pulley.

Referring to the above drawings, the belt will be seen to be formed of a plurality of elongated wire coils $a$, secured at their ends to a plurality of links $b$. The links are preferably formed with an offset portion $b'$ in order to permit the ends thereof to overlap and thus enable the links to be interchangeable. In the preferred form, the coils $a$ are welded to the links but it is obvious that this specific manner of securing the coils may be changed to suit the individual requirements.

Lying between the coils $a$ and passing through the convolutions thereof are similarly formed wires $c$ which are also secured, at their ends, to the links $b$. Each pair of opposed links $b$ has secured thereto, a coil $a$ and a coil $c$, thus, in effect, forming a complete unit of such elements. This unit, being integral, turns bodily as the belt passes over a pulley and thus facilitates flexing of the belt about an axis transverse thereto. The transverse axis of flexing, it will be seen from Figure 1, passes through aligned pins $b^3$ on opposite links and also through the points of interengagement between the coils $a$ and $c$, in line with such pins. By welding the ends of the coils $a$ and $c$ at substantially the mid-points of the opposed links, respectively, the coils will be interengaged on such transverse axis of flexing on the axes of opposed pins $b^3$.

The links $b$ are each formed at one end with an elongated slot $b^2$ and at the other end with a pin or rivet $b^3$. The pin of one link is received in the elongated slot of an adjacent link and thus affords a connection between such links which provides for relative movement therebetween. In this fashion, as the belt passes over a pulley, each link is substantially free of other links to assume any desired position upon the pulley without involving a substantial friction loss. Although a limited degree of elongation of the belt is provided for, when the pins engage the ends of the slots $b^2$, the belt forms a solid connection and positively prevents further elongation thereof.

While the invention has been described with specific reference to the accompanying drawings, it is not to be limited, save as defined in the appended claims.

I claim as my invention:

1. A conveyer belt comprising a plurality of pairs of interengaging coils, the coils of each pair diverging in opposite directions, a plurality of pairs of rigid links to which are secured the ends of the respective coils, said links each having an elongated recess at one end and a circular recess at the other end, and pins extending through a circular recess and an adjacent elongated recess of the respective links.

2. An articulated conveyer belt comprising a plurality of units hinged for pivotal movement with respect to each other about axes transverse to the belt, the units each comprising two elongated coils of wire rigidly connected to opposed links and the adjacent links each being formed with a circular and an elongated recess at the respective ends thereof in the axes of the respective hinge connections between the units, and pins in the adjacent recesses to secure the links together.

This specification signed this 6th day of November, A. D. 1930.

VERNON C. KING.